United States Patent
Staun et al.

(10) Patent No.: US 10,856,371 B2
(45) Date of Patent: Dec. 1, 2020

(54) WIRELESS SENSOR IN A MICROWAVE OVEN

(71) Applicant: Midea Group Co., Ltd., Foshan (CM)

(72) Inventors: Paul R. Staun, Louisville, KY (US); Bryan T. Snook, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 319 days.

(21) Appl. No.: 16/019,106

(22) Filed: Jun. 26, 2018

(65) Prior Publication Data

US 2019/0394840 A1 Dec. 26, 2019

(51) Int. Cl.
  *H05B 6/64* (2006.01)
  *H05B 6/68* (2006.01)
  *G01K 1/02* (2006.01)
  *G01K 13/00* (2006.01)

(52) U.S. Cl.
  CPC ............ *H05B 6/6452* (2013.01); *G01K 1/02* (2013.01); *H05B 6/686* (2013.01); *H05B 6/687* (2013.01); *G01K 2207/06* (2013.01)

(58) Field of Classification Search
  CPC ...... G01K 1/024; H05B 6/6452; H05B 6/686; H05B 6/6411
  See application file for complete search history.

(56) References Cited

U.S. PATENT DOCUMENTS

| | | | |
|---|---|---|---|
| 4,089,222 A | * | 5/1978 | Perkins .................. G01K 1/024 116/101 |
| 4,149,056 A | * | 4/1979 | Kaneshiro ................ G01K 1/00 219/712 |
| 4,230,731 A | * | 10/1980 | Tyler ..................... G01K 1/024 219/713 |
| 4,297,557 A | | 10/1981 | Tyler et al. |
| 4,308,445 A | * | 12/1981 | Offutt .................. H05B 6/6411 219/755 |

(Continued)

FOREIGN PATENT DOCUMENTS

| | | |
|---|---|---|
| DE | 2935271 A1 | 4/1980 |
| EP | 2116829 B1 | 7/2016 |

(Continued)

OTHER PUBLICATIONS

"Wireless Meat Thermometer, Bluetooth Remote Cooking Thermometer, Digital Oven Thermometer with 6 Probe Port for BBQ Grilling Smoker Kitchen, iPhone & Android Phone Supported by Uvistare—Chugod" www.amazon.com. Retrieved Dec. 31, 2017.

(Continued)

*Primary Examiner* — Dana Ross
*Assistant Examiner* — Lawrence H Samuels
(74) *Attorney, Agent, or Firm* — Middleton Reutlinger

(57) ABSTRACT

A microwave oven is described herein. In some instances, such a microwave oven may include a housing; a rotating turntable assembly disposed in a cooking cavity of the housing; a probe powered by the turntable assembly, where the probe is configured to measure an environmental condition during a cooking cycle and where the probe is configured to transmit a signal regarding the environmental condition; and a controller disposed in the housing and configured to receive the signal regarding the environmental condition from the probe. A method of operating a microwave oven for sous vide cooking is also disclosed.

22 Claims, 8 Drawing Sheets

(56) References Cited

U.S. PATENT DOCUMENTS

| | | | | |
|---|---|---|---|---|
| 4,309,585 A * | 1/1982 | Doi | | H05B 6/66 219/506 |
| 4,340,796 A * | 7/1982 | Yamaguchi | | G01K 1/024 219/516 |
| 4,377,733 A * | 3/1983 | Yamaguchi | | G01K 1/024 219/516 |
| 4,381,439 A * | 4/1983 | Miyazawa | | A47J 37/00 219/713 |
| 4,475,024 A * | 10/1984 | Tateda | | G01K 1/024 219/713 |
| 4,691,087 A * | 9/1987 | Lee | | H05B 6/6411 219/712 |
| 4,895,067 A * | 1/1990 | Ohji | | F24C 7/08 99/325 |
| 5,043,547 A * | 8/1991 | Lee | | H05B 6/6411 219/712 |
| 5,491,323 A * | 2/1996 | Mori | | H05B 6/645 219/494 |
| 5,951,900 A | 9/1999 | Smrke | | |
| 6,274,859 B1 * | 8/2001 | Yoshino | | H05B 6/6411 219/746 |
| 6,568,848 B1 | 5/2003 | Chapman et al. | | |
| 7,351,941 B2 | 4/2008 | Kim | | |
| 7,722,248 B1 | 5/2010 | Chapman et al. | | |
| 8,348,504 B2 | 1/2013 | Gregory et al. | | |
| 8,398,303 B2 * | 3/2013 | Kuhn | | G01K 1/026 374/163 |
| 8,636,407 B2 | 1/2014 | Woodard | | |
| 8,931,400 B1 | 1/2015 | Allen | | |
| 9,414,442 B2 | 8/2016 | Torres et al. | | |
| 2003/0202558 A1 | 10/2003 | Chung et al. | | |
| 2006/0219705 A1 * | 10/2006 | Beier | | G01K 1/024 219/627 |
| 2009/0188396 A1 * | 7/2009 | Hofmann | | H05B 6/6452 99/342 |
| 2013/0112683 A1 * | 5/2013 | Hegedis | | A47J 36/321 219/660 |
| 2015/0173129 A1 * | 6/2015 | Tils | | G01K 1/026 374/1 |
| 2015/0312964 A1 | 10/2015 | Sorenson et al. | | |
| 2016/0377490 A1 | 12/2016 | Nivala et al. | | |
| 2017/0013681 A1 | 1/2017 | Lee et al. | | |
| 2017/0089768 A1 | 3/2017 | Wu et al. | | |
| 2017/0238751 A1 | 8/2017 | Vengroff | | |

FOREIGN PATENT DOCUMENTS

| | | |
|---|---|---|
| JP | 56147025 A | 11/1981 |
| JP | 5782628 A | 5/1982 |
| JP | 599892 A | 1/1984 |
| JP | 6188487 A | 5/1986 |
| JP | 6207447 B2 | 4/2017 |
| WO | WO2010023237 A1 | 3/2010 |
| WO | WO2016162498 A1 | 10/2016 |
| WO | WO2017029059 A1 | 2/2017 |

OTHER PUBLICATIONS

Kawahara et al. "Power Harvesting from Microwave Oven Electromagnetic Leakage" UbiComp'13, Sep. 8-12, 2013.

International Search Report and Written Opinion of PCT Ser. No. PCT/CN2018/123155, dated Mar. 1, 2019.

* cited by examiner

WIRELESS SENSOR IN A MICROWAVE OVEN

BACKGROUND

The quality, and safety, of foods cooked is often dependent of the food reaching a desired internal temperature and maintaining that temperature for a desired period of time. As such, it is may be desirable to measure a temperature, moisture level, or the other characteristics of a foodstuff being cooked during the cooking process, and modifying the cooking process accordingly. Such monitoring may be especially difficult in a microwave oven setting. Typically, microwave ovens with such capabilities include a temperature sensor on a wired probe that is affixed to and powered through the side wall; however, side wall-mounted sensors present a number of limitations. For example, most microwave ovens include a turntable that rotates the food item(s) to be cooked in order to facilitate even cooking. Where a probe is wired to a side wall connection, this wired connection inhibits rotation of the turntable. There exists a need in the art for a sensor that allows for measurement of various characteristics of the food item(s), while simultaneously allowing the turntable to rotate.

SUMMARY

The herein-described embodiments address these and other problems associated with the art by utilizing in one aspect a probe drawing its electrical power from a turntable assembly to measure one or more environmental conditions within a microwave oven during cooking.

Therefore, consistent with one aspect of the invention a microwave oven is disclosed, the microwave oven including: a housing; a rotating turntable assembly disposed in a cooking cavity of the housing; a probe powered by the turntable assembly, where the probe is configured to measure an environmental condition during a cooking cycle, where the probe is configured to transmit a signal regarding the environmental condition; and a controller disposed in the housing and configured to: receive the signal regarding the environmental condition from the probe.

In some embodiments, the turntable assembly includes a generator that is powered by rotation of the turntable assembly. In other embodiments, the generator further includes a wheel that contacts a surface in the cooking cavity and that drives the generator as the rotating turntable rotates.

In some embodiments, the turntable assembly includes an axle that powers the probe. In other embodiments, the axle includes first and second electrical contacts that communicate an electrical power signal to the probe.

In some embodiments, the microwave further includes a wireless transmitter in communication with the probe and an antenna coupled to the wireless transmitter to transmit the signal regarding the environmental condition to the controller, and where the controller is coupled to a wireless receiver configured to receive the signal regarding the environmental condition from the wireless transmitter.

In some embodiments, the environmental condition is a temperature. In other embodiments, the environmental condition is a moisture level. In some embodiments, the probe is insertable into a food item and the temperature measured is an internal temperature. In other embodiments, the probe is configured to rotate with a rotatable portion of the turntable assembly.

In some embodiments, the controller is further configured to display the temperature measured by the probe. In other embodiments, the controller is further configured to modify one or more microwave oven settings in response to the signal regarding the environmental condition.

In another aspect, a method of operating a microwave oven including a housing, a rotating turntable assembly disposed in a cooking cavity, a probe, and a controller is disclosed, such a method including: rotating the rotating turntable assembly; powering the probe with the rotating turntable assembly during rotation of the rotating turntable assembly; sensing, by the probe, an environmental condition; transmitting, by the probe, a signal regarding the sensed environmental condition; and receiving, by the controller, the signal regarding the environmental condition.

In some embodiments, the method additionally includes modifying, by the controller, one or more microwave oven settings in response to the environmental condition sensed.

In some embodiments, the environmental condition is a temperature and the method further includes displaying the temperature sensed by the probe. In other embodiments, the modifying one or more microwave oven settings includes adjusting an output of a cooking element of the microwave oven. In still other embodiments, the modifying one or more microwave oven settings includes adjusting a preset cooking time.

In some embodiments, powering the probe with the rotating turntable assembly includes powering a generator by the rotating the turntable assembly. In some embodiments, powering the probe with the rotating turntable assembly includes powering the probe from an axle of the rotating turntable assembly. In other embodiments, the probe is wireless and transmitting a signal regarding the environmental condition further includes transmitting the signal with a wireless transmitter and antenna.

In some embodiments, the environmental condition is a moisture level.

In yet another aspect, a method of operating a microwave oven for sous vide cooking, the microwave oven including a housing, a cooking cavity disposed within the housing, a probe, and a controller is disclosed. Such a method including: submerging at least a portion of the probe in a water bath contained within the cooking cavity; sensing, by the probe, a temperature of the water bath; transmitting, by the probe, a signal regarding the temperature of the water bath; receiving, by the controller, the signal regarding the temperature of the water bath; and regulating, by the controller, an output of a cooking element of the microwave oven so as to hold the water bath at a preset temperature.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

In some embodiments discussed hereinafter, a turntable assembly of a microwave oven may be used to power a probe that rotates with the turntable assembly and is used to sense an environmental condition. As will become more apparent below, a turntable assembly may be used in some embodiments to generate electrical power for a probe coupled to a rotatable portion of the turntable assembly by converting mechanical energy, i.e., the rotation of the turntable, into electrical power, e.g., using a generator that is driven via rotation of the turntable. In addition, in some embodiments, electrical energy may be conveyed through a turntable assembly to power a probe coupled to a rotatable portion of the turntable assembly.

In addition, as will also become more apparent below, some embodiments may also support the use of a probe to perform sous vide cooking within a microwave oven. The probe may be used, for example, to sense temperature and thereby enable a controller of the microwave oven to maintain a water bath at a preset temperature over the course of a sous vide cooking operation.

Figure 1:
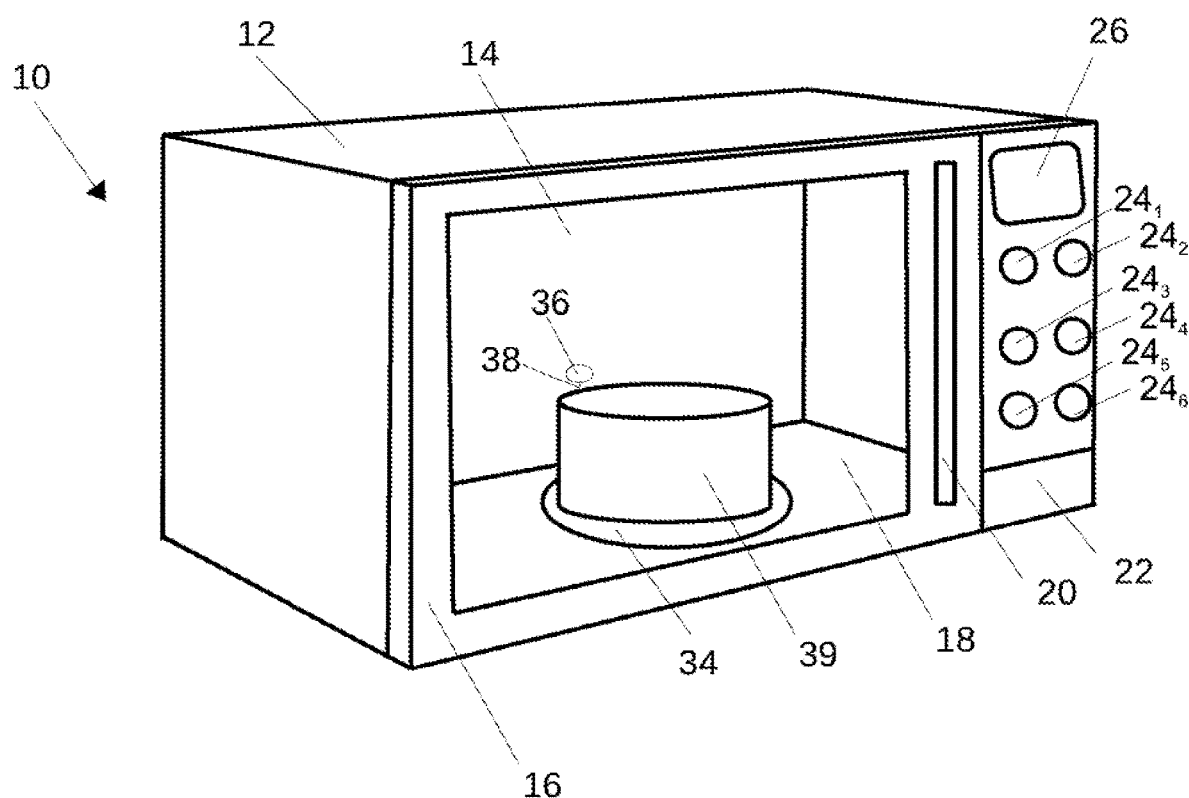
FIG. 1 is a perspective view of a microwave oven consistent with some embodiments of the invention.
Figure 2:
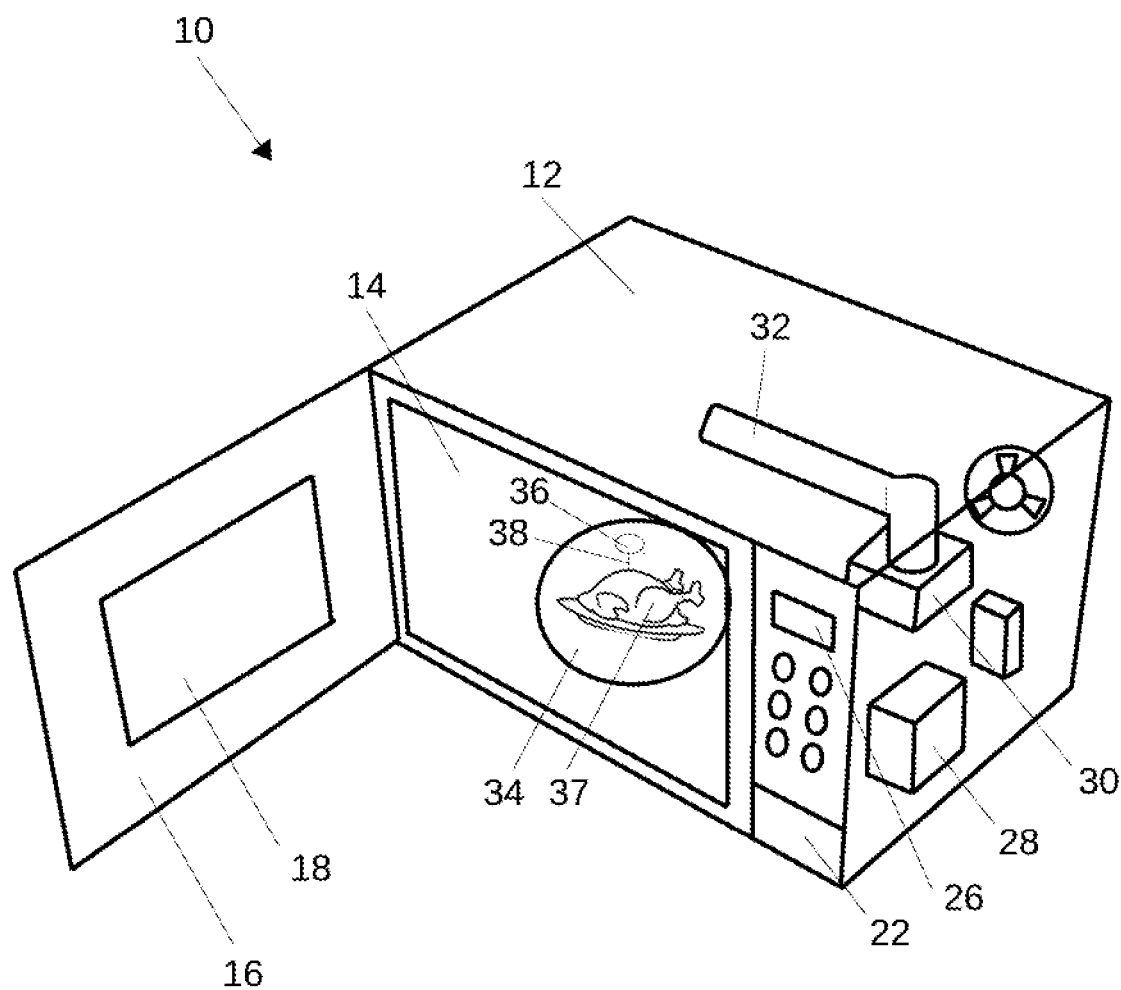
FIG. 2 is a perspective view of the microwave oven of FIG. 1 with various internal components of the microwave oven illustrated.

Turning now to the drawings, wherein like numbers denote like parts throughout the several views, FIGS. 1 and 2 illustrates an example microwave oven 10 in which the various technologies and techniques described herein may be implemented. Microwave oven 10 is a residential-type microwave oven, and as such includes a housing 12, which further includes a cooking cavity 14, as well as a door 16 disposed adjacent the respective opening of the cooking cavity 14. In some embodiments, the door 16 may further include a window 18 that allows a user to view the items inside the cooking cavity 14 and a handle 20. In other embodiments, in place of, or in addition to the handle 20, the microwave oven 10 may include a button 22 that a user may press to trigger the opening of the door 16.

The microwave oven 10 may also include one or more user activated controls $24_{1-n}$, which may be in the form of buttons, knobs, a touchscreen, or the like. In some embodiments, these user activated controls $24_{1-n}$ may be used to preprogram a cooking time and/or a cooking temperature. In other embodiments, these user activated controls $24_{1-n}$ may be used to selected one or more preset conditions for a particular food item to be cooked or a particular desired action (e.g. "popcorn", "defrost", "frozen pizza", etc.). The microwave oven 10 may also include a display 26, which may be used to convey a variety of information to a user. For example, in some embodiments, the display 26 may be used to display the time when the microwave oven 10 is not in use. In other embodiments, the display 26 may be used to display cooking times and/or temperatures.

Referring particularly to FIG. 2, various internal components of the microwave oven 10 are illustrated. A transformer 28 may covert standard 120 volt household electricity to about 4,000 volts (or higher depending on the specific microwave oven) in order to provide power to one or more cooking elements, e.g., a magnetron 30. This conversion allows the magnetron 30 to generate microwaves from the increased voltage. This increased voltage may heat a filament (not shown) at the center of the magnetron 30, which results in the release of electrons. The movement of these electrons throughout the magnetron 30 may be facilitated by magnets, which may be, for example, shaped in the form of rings, which generate microwaves at a desired frequency. Typically, household microwave ovens operate at a microwave frequency of about 2.45 gigahertz; however, this is not intended to be limiting, and in some embodiments may vary. Once generated at the desired frequency, the microwaves are transmitted into and throughout the cooking cavity 14 by an antenna 32 coupled with the magnetron 30. The microwaves bounce around the cooking cavity 14 and penetrate the food item(s) during the operation of the microwave oven 10, which results in the heating (and cooking) of the food item(s).

The microwave oven 10 may further include a turntable assembly 34 (described in greater detail with respect to FIG. 4) disposed inside the cooking cavity 14. In some embodiments, the turntable assembly 34 may be positioned centrally in the cooking cavity 14; although this is not intended to be limiting. One or more food items may be placed on the turntable assembly 34, so that as the turntable assembly 34 rotates so do the one or more food items 37 contained thereon. This rotation may facilitate more even heating (or cooking) of the food item(s).

Additionally, the microwave oven 10 may include a probe 36 that contains one or more sensors 38 that may in some instances be capable of being inserted into a food item to measure an environmental condition during the cooking cycle. Such environmental conditions may include, for example, an internal temperature of the food item 37, moisture level, or the like. As used herein, the term "food item" may include any item inserted into a microwave oven 10 to be heated; although this may typically be a foodstuff for consumption 37 (as illustrated in FIG. 2), it is not so limited. In some embodiments the "food item" may be a water bath 39 that may be used for sous vide cooking, for example as illustrated in FIG. 1. As described in greater detail herein, the probe 36 may be powered by the rotation of the turntable assembly 34.

Figure 3:
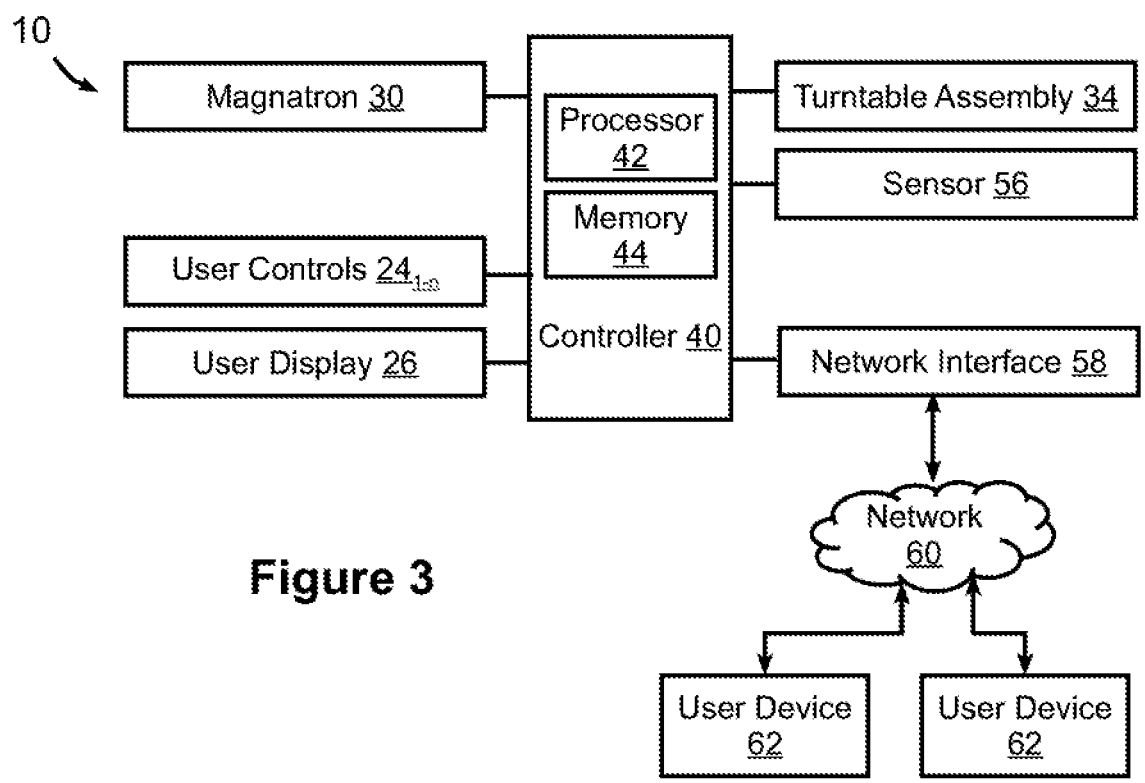
FIG. 3 is a block diagram of an example control system for the microwave oven of FIG. 1.

A microwave oven consistent with the description herein may also generally include one or more controllers configured to control the operation of the microwave oven 10 as well as manage interaction with a user. FIG. 3, for example, illustrates an example embodiment of a microwave oven 10 including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 3, controller 40 may be interfaced with various components, including a magnetron 30, a motor or other drive for turntable assembly 34, one or more user activated controls $24_{1-n}$ for receiving user input (e.g., various combinations of switches, knobs, buttons, sliders, touchscreens or touch-sensitive displays, microphones or audio input devices, image capture devices, etc.), and one or more displays 26 (including various indicators, graphical displays, textual displays, speakers, etc.), as well as various additional components suitable for use in a microwave oven.

Controller 40 may also be interfaced with one or more sensors 56 to sense environmental conditions of a food item in the cooking cavity 14 and/or the cooking cavity 14 itself, e.g., one or more temperature sensors, humidity/moisture level sensors, etc. Such sensors 56 may be located on a probe, discussed in greater detail herein. In some embodiments, the one or more sensors 56 may be wirelessly coupled to controller 40; although in other embodiments, the one or more sensors 56 may be coupled to the controller 40 through one or more wires.

In some embodiments, controller 40 may also be coupled to one or more network interfaces 58, e.g., for interfacing with external devices via wired and/or wireless networks such as Ethernet, Wi-Fi, Bluetooth, NFC, cellular and other suitable networks, collectively represented in FIG. 3 at 60. Network 60 may incorporate in some embodiments a home automation network, and various communication protocols may be supported, including various types of home automation communication protocols. In other embodiments, other wireless protocols, e.g., Wi-Fi or Bluetooth, may be used.

In some embodiments, microwave oven 10 may be interfaced with one or more user devices 62 over network 60, e.g., computers, tablets, smart phones, wearable devices, etc., and through which microwave oven 10 may be controlled and/or microwave oven 10 may provide user feedback.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized, and/or supplemented with other techniques known in the art, and therefore, the invention is not limited to the particular sequences of operations described herein.

Numerous variations and modifications to the microwave oven illustrated in FIGS. 1-3 will be apparent to one of ordinary skill in the art, as will become apparent from the description below. Therefore, the invention is not limited to the specific implementations discussed herein.

Figure 4:
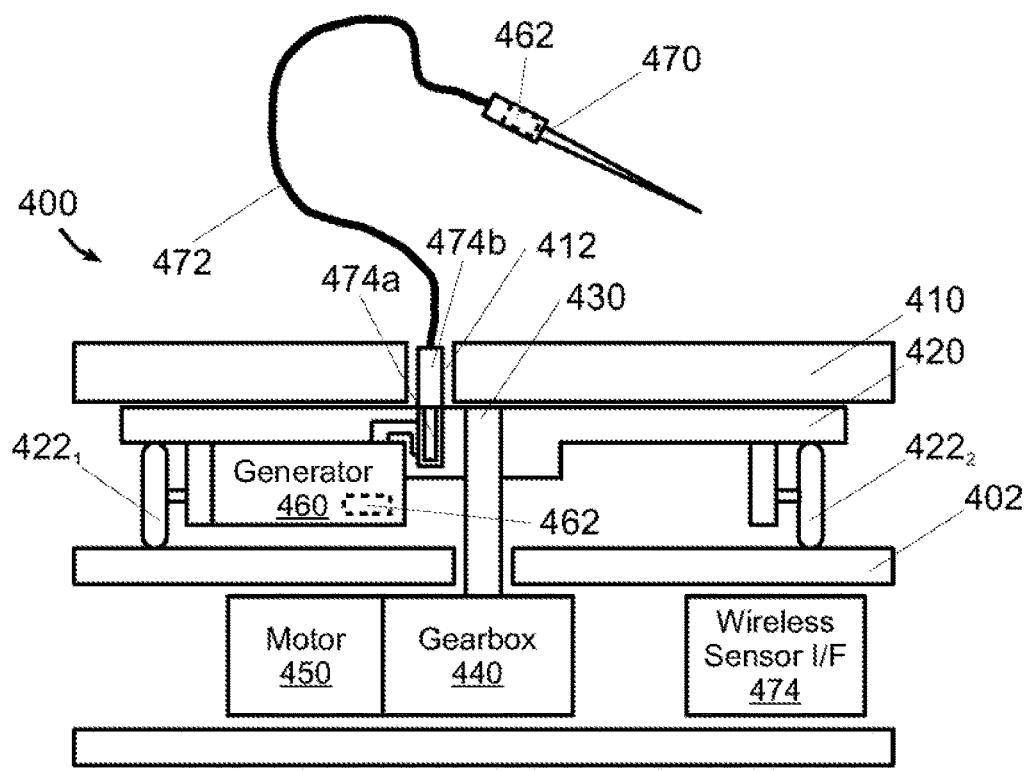
FIG. 4 is a cross-sectional view of a turntable assembly consistent with some embodiments of the invention.

Referring now to FIG. 4, a turntable assembly 400 is illustrated. The turntable assembly may have movable and fixed portions, and may be used to rotate a food item during cooking. In some embodiments, the turntable assembly 400 may include any combination of the following: a turntable plate 410, hub 420, axle 430, one or more gears contained within a gearbox 440, and/or a motor 450. The turntable plate 410 provides a surface upon which the food item(s) may sit; the turntable plate 410 rotates allowing the food item(s) to cook evenly. In some embodiments, the turntable plate 410 may be constructed of glass; while in other embodiments, the turntable plate 410 may be constructed of a durable, heat-safe plastic material. The turntable plate 410 may sit on top of, or be coupled to, a hub 420. The hub 420, may elevate the turntable plate 410 off of a lower surface 402 of the cooking cavity of the microwave oven. The hub 420 may include a plurality of wheels $422_{1-n}$ that may both support hub 420 and associated turntable plate 410 while they rotate. The hub 420 may be connected to one or more gears contained within a gear box 440 by an axle 430. Motor 450 powers the movement of the one or more gears (not illustrated) contained within the gear box 440, which through connection to the axle 430 may then cause the hub 420 and associated turntable plate 410 to rotate. The turntable assembly 400 may power a probe 470 containing one or more sensors to measure one or more environmental conditions.

In the embodiment illustrated in FIG. 4, the turntable assembly 400 may further include a generator 460. The generator 460 may be mounted to the hub 420, or in some embodiments may be mounted directly to the turntable plate 410; however, neither position is limiting, as the generator may be mounted to any portion of the turntable assembly 400. The generator 460 generates energy from the rotation of the turntable assembly 400. As illustrated in FIG. 4, the generator 460 may be coupled with the probe 470 and may provide the electrical power necessary for operating the probe, including in some embodiments, wirelessly transmitting one or more signals regarding the measured environmental condition to a wireless sensor interface 474 and/or controller. In some instances, the generator 460 may be connected to a small wheel 422 that rolls on a lower surface of the cooking cavity 402 as the plate rotates inside the microwave oven. In some embodiments, such as illustrated, this wheel may be one of the wheels that supports the hub 420; however, this is not intended to be limiting, as in other embodiments the generator 460 may have its own wheel independent of the wheels that support the hub 420. In such instances, it is this rotating wheel 422 that may generate the electrical power necessary to operate the probe 470. In some embodiments, the wheel 422 may be rubber; in other embodiments, the wheel 422 may be a heat-safe plastic. In some embodiments, particularly where the probe wirelessly transmits the data regarding measured environmental conditions to the controller, the turntable assembly 400 may include a wireless transmitter 462. The wireless transmitter 462 is illustrated in broken line to represent two possible positions, of any number of possible positions, within the turntable assembly 400 including, but not limited to, within the probe itself or within the generator 460.

Figure 5:
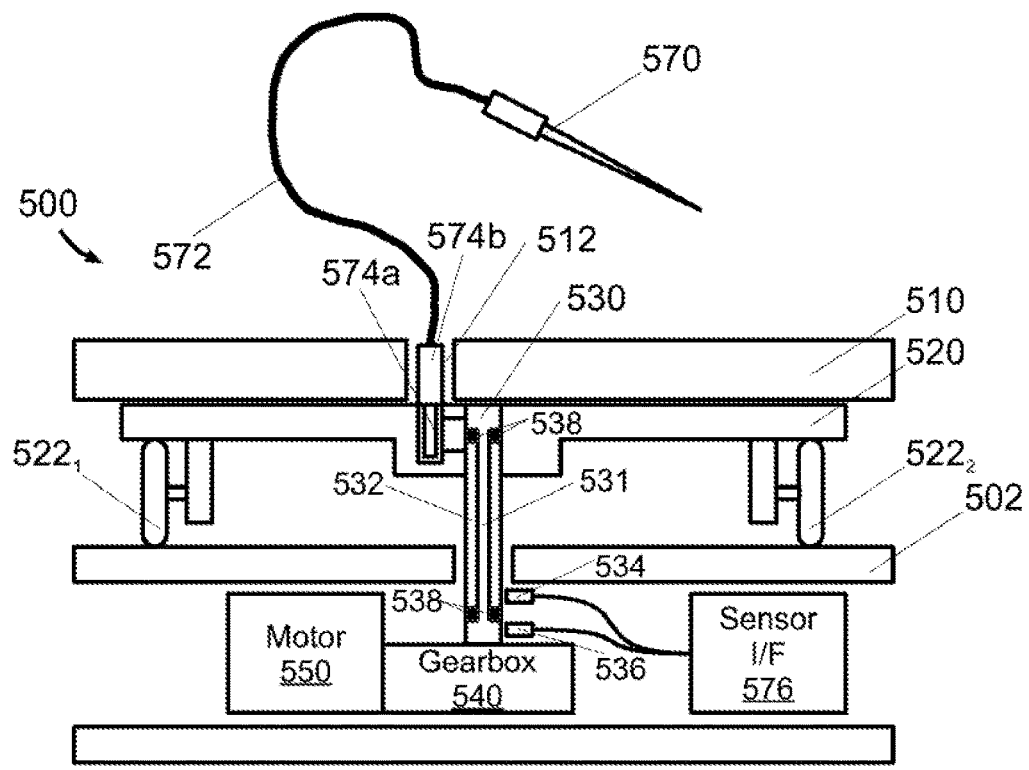
FIG. 5 is a cross-sectional view of a turntable assembly with consistent with some embodiments of the invention.

Referring now to FIG. 5, another embodiment of a turntable assembly 500 is illustrated. Similar to the turntable assembly of FIG. 4, turntable assembly 500 may include any combination of the following: a turntable plate 510, hub 520, axle 530, one or more gears contained within a gearbox 540, and/or a motor 550. As with the previous embodiment illustrated in FIG. 4, the turntable plate 510 provides a surface upon which the food item(s) may sit; turntable plate 510 rotates allowing the food item(s) to cook evenly. In some embodiments, the turntable plate 510 may be constructed of glass; while in other embodiments, the turntable plate 510 may be constructed of a durable, heat-safe plastic material. The turntable plate 510 may sit on top of, or be coupled to, a hub 520. The hub 520, may elevate the turntable plate 510 off of a lower surface 502 of the cooking cavity of the microwave oven. The hub 520 may include a plurality of wheels $522_{1-n}$, which may both support hub 520 and associated turntable plate 510 while they rotate. The hub 520 may also be connected to one or more gears contained within a gear box 540 by an axle 530. Motor 550 powers the movement of the one or more gears (not illustrated) contained within the gear box 540, which through connection to the axle 530 may then cause the hub 520 and associated turntable plate 510 to rotate. The turntable assembly 500 may power a probe 570 containing one or more sensors to measure one or more environmental conditions.

In the embodiment illustrated in FIG. 5, the power necessary to power to the probe 570 may be transmitted by the axle 530. The axle 530 includes two electrically conductive portions that are electrically isolated from one another to communicate an electrical signal through the axle. In one embodiment, for example, a metal sleeve 532 may be electrically isolated from a metal main body 531 of axle 530 by one or more washers or bushings 538. All of these components rotate together, transferring electrical energy from first 534 and second 536 electrical contacts that slide along the axle during the axle's rotation to the probe 570. This energy may then be used to power the probe 570, which may take measurements of various environmental conditions (e.g. temperature, moisture level, etc.). The probe 570 may then transmit a signal regarding the measured environmental condition(s) to a sensor interface 576 and/or controller, through one or more wired connections.

Figure 6:
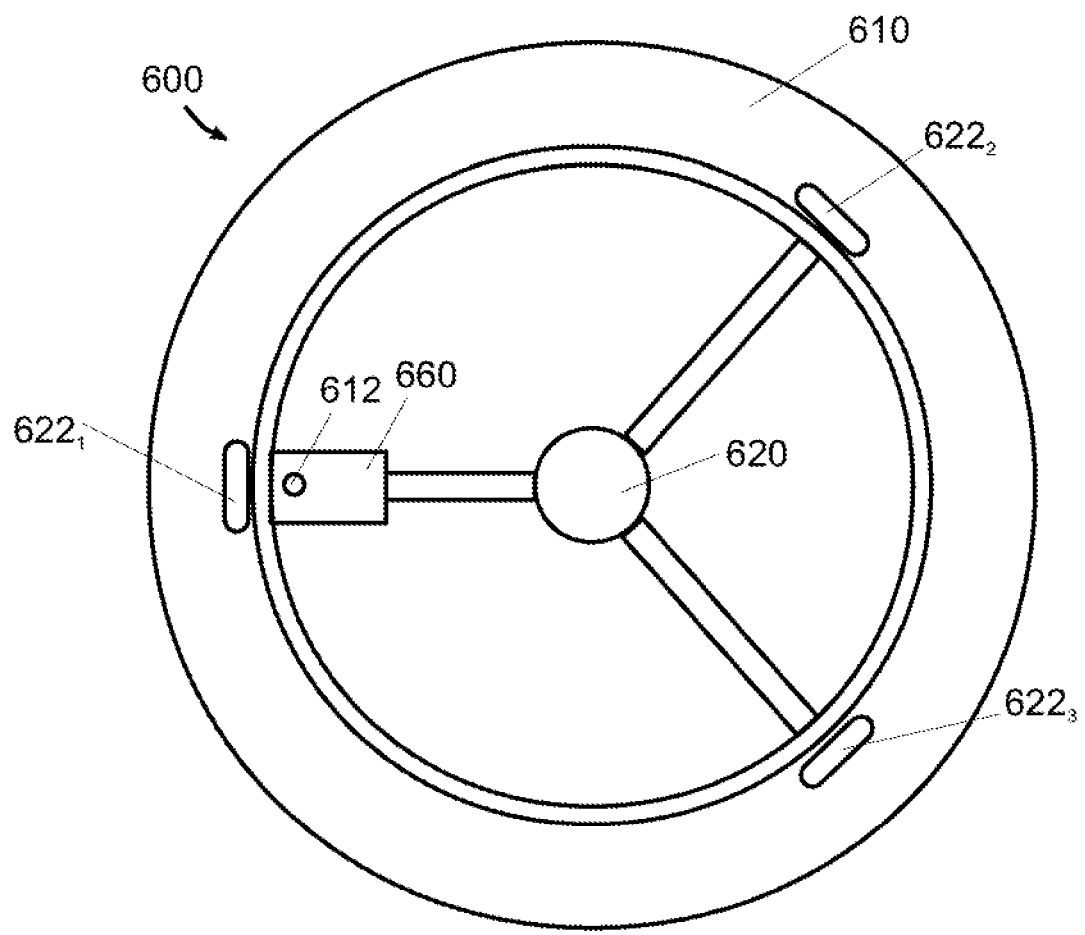
FIG. 6 is a top view of a turntable assembly consistent with some embodiments of the invention.

In some embodiments, such as illustrated in both FIGS. 4 and 5, there may be an opening 412, 512 in the turntable plate 410, 510 through which at least a portion of the probe 470, 570 or wire 472, 572 connected to the probe 470, 570 extends. In some embodiments, this opening 412, 512 may be in the center or the turntable plate 410, 510; however, in other embodiments, such an opening may be towards the exterior perimeter of the turntable plate, such as illustrated in FIG. 6. In still other embodiments, this opening may be on the side edge of the turntable plate or may be omitted entirely, e.g., where a receiving portion of a plug-like connection is disposed on the hub.

In some embodiments, the probe 450, 550 may be continuously wired to the power source (e.g. the generator 460 in FIG. 4). The wire 472, 572 may directly couple with the power source and extend through the opening 412, 512 in the turntable plate 410, 510 to the probe 470, 570. In some embodiments, there is an amount of excess wire provided at the probe 470, 570 to allow for placement of the probe in various locations within the cooking cavity of a microwave oven.

In other embodiments, the probe may be removably attached to the power source, for example through a plug-like connection 474, 574, such as illustrated in FIGS. 4 and 5. In such embodiments, the receiving portion 474a, 574a of the plug-like connection may be disposed within the hub 420, 520 and attached to the power source. The insertion portion 474b, 574b of the plug-like connector may be attached at an opposing end of the wire 472, 572 from the probe 470, 570 and when coupled with the receiving portion 474a, 574a may be disposed within the opening 412, 512 of the turntable plate 410, 510. Although described and illustrated as being positioned in the hub 420, 520, the disposition of the receiving portion 474a, 574a of the plug-like connector 474, 574 is not limited. In other embodiments, the receiving portion 474a, 574a may positioned in any number of locations, including in the opening 412, 512 of the turntable plate 410, 510, the side of the turntable plate, and so on. In some instances, the use of a plug-like connector 474, 574 that allows for the probe 470, 570 to be decupled from the power supply may allow for easier cleaning of the probe 470, 570 by a user.

Once the probe 470, 570 has measured the one or more environmental conditions (e.g. a temperature, moisture level, etc.) and transmitted a signal regarding the same, the controller may be configured to receive that signal from the probe. In some instances, the controller may then provide a user with an indication of the measured condition. For example, the controller may be configured to display the environmental condition (e.g. temperature) on the one or more displays. This display may be in the form of a digital number on an LCD/LED screen; however, this is not intended to be limiting, in other embodiments the display may be in the form of one or more indicator lights, etc. Additionally, or alternatively, the controller may be configured to modify one or more microwave oven settings in response to the signal received regarding the environmental condition. For example, if the probe measures an internal temperature of the food item to be higher than a preset value, the controller may lower the output of the microwave oven or turn the microwave oven off all together in response. In another example, particularly where the probe is being used in a water bath for sous vide cooking (discussed in greater detail with respect to FIG. 9) the controller may raise or lower the output of the microwave oven in order to maintain the temperature of the water bath in a desired range.

Referring now to FIG. 6, a top view of a turntable assembly 600 is illustrated. Similar to the previously illustrated and described embodiments, the turntable assembly 600 may include a turntable plate 610, hub 620, axle, gearbox, and/or a motor. The turntable plate 610 may sit on top of, or be coupled to, a hub 620, so that the turntable plate 610 is elevated off of a lower surface of the cooking cavity of the microwave oven. The hub 620 may include a plurality of wheels $622_{1-n}$, which may both support hub 620 and associated turntable plate 610 while they rotate. The turntable assembly 600 may further include a generator 660 mounted to the hub 620, which may function similarly to the generator described in reference to FIG. 4. The turntable assembly 600 may further include an opening 612 in the turntable plate 610 through which at least a portion of a probe or wire connected to the probe extends. As illustrated in FIG. 6, the opening 612 may be towards the exterior perimeter of the turntable plate 610. In some instances, such a disposition of the opening 610 may be less likely to interfere with the placement of a plate, bowl, or other cookware on the turntable plate 610.

Figure 7:
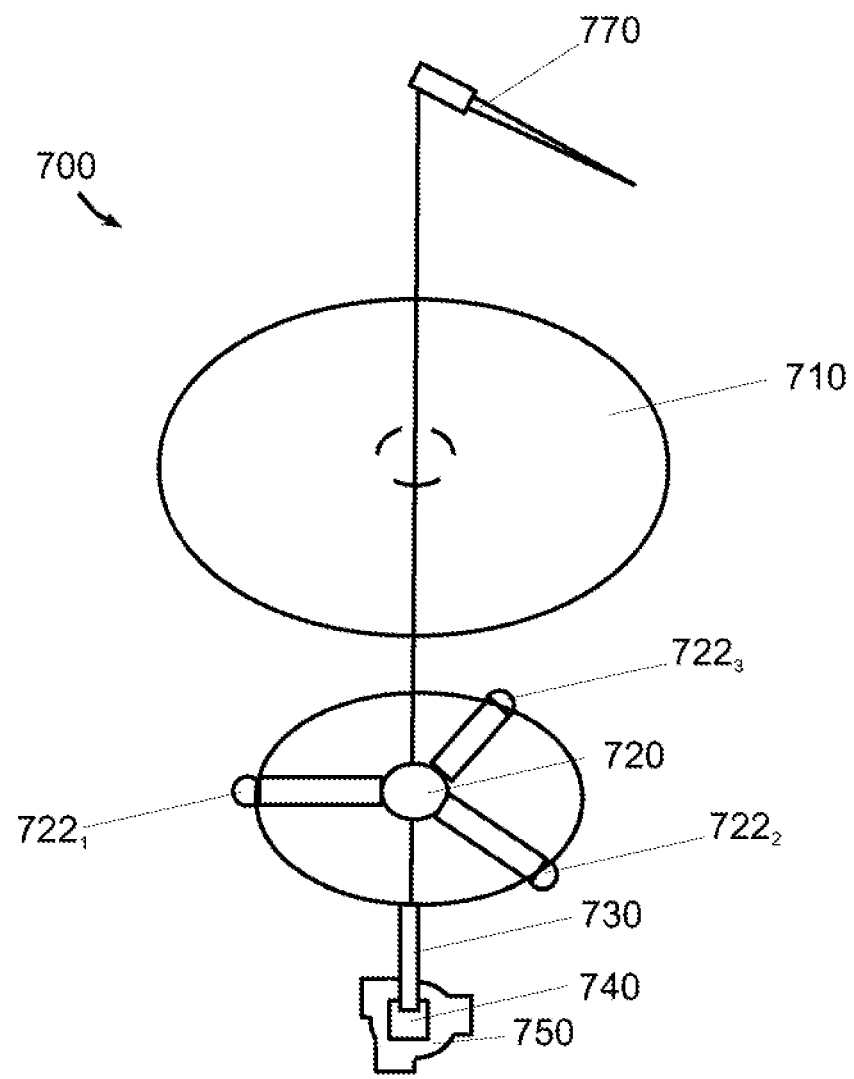
FIG. 7 is an exploded view of a turntable assembly consistent with some embodiments of the invention.

Referring now to FIG. 7, a turntable assembly 700 consistent with the description herein is illustrated in an exploded view. Similar to the embodiments described with reference to FIGS. 4-6, this turntable assembly 700 may also have movable and fixed portions, and may include any combination of a turntable plate 710, hub 720, axle 730, one or more gears contained within a gearbox 740, and/or a motor 750. As described previously, the turntable plate 710 may provide a surface upon which the food item(s) may sit and allow them to rotate and to cook evenly. As illustrated in the exploded view of FIG. 7, the turntable plate 710 may sit on top of, or be coupled to, a hub 720, which may include a plurality of wheels $722_{1-n}$ that may both support hub 720 and associated turntable plate 710 while they rotate. The hub 720 may be connected to one or more gears (not illustrated) contained within a gear box 740 by an axle 730. Motor 750 powers the movement of the gear(s) contained within the gear box 740, which through connection to the axle 730 may the cause the hub 720 and associated turntable plate 710 to rotate. The turntable assembly 700 may power a probe 770 containing one or more sensors to measure one or more environmental conditions.

Figure 8:
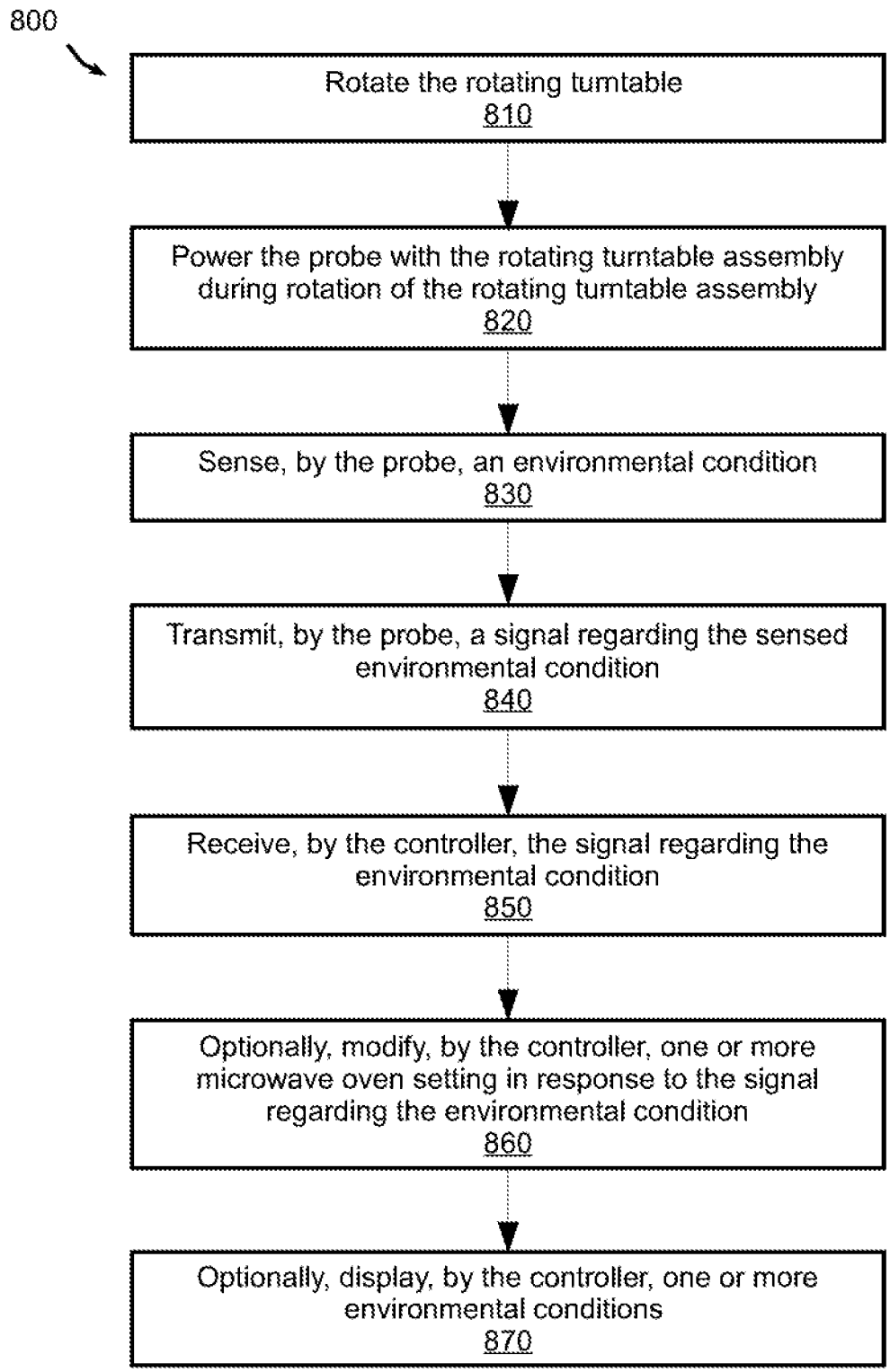
FIG. 8 is an operational flow for a microwave oven with a probe for measuring one or more environmental conditions consistent with some embodiments of the invention.

Now turning to FIG. 8, an example embodiment of an operational flow 800 for a microwave oven 10 with a probe 36 for measuring one or more environmental conditions, such as illustrated in FIGS. 1 and 2 and described herein. In block 810, a turntable assembly is rotated during a cooking cycle of the microwave oven. In block 820, the rotation of the turntable assembly powers the probe. In some embodiments, the turntable assembly may include a generator, and the rotation of the turntable assembly powers the generator, which in turn powers the probe. In some instances, where a generator is used, the probe may be wirelessly powered. In other embodiments, the turntable assembly may include an axle, the axle including first and second electrical contacts that communicate an electrical power signal to the probe.

In block 830, one or more environmental conditions (e.g. temperature, moisture level, etc.) are sensed by the probe. In some embodiments, the probe may measure the one or more environmental conditions at predetermined time intervals; in other embodiments, the probe may be constantly measuring the one or more environmental conditions. In still other embodiments, the probe may only measure the one or more environmental conditions when signaled by user input via one or more user activated controls. Depending on the positioning of the probe, the environmental condition measured may be, for example, an internal food temperature or an ambient temperature inside of the cooking cavity of the microwave oven.

In block 840, a signal regarding the measured environmental condition is transmitted by the probe. In some embodiments, particularly where the probe is wireless, the probe or the turntable assembly may further include an antenna which may transmit the signal regarding the environmental condition. In other embodiments, particularly where an axle may be used to power the probe, the probe may be wired to the controller, and thus transmit the signal over the wired connection. In block 850, the controller receives the signal transmitted by the probe regarding the environmental condition.

In block 860, the controller may, optionally, modify one or more microwave oven settings in response to the signal regarding the environmental condition. This modification may, in some instances, including displaying measurements or data taken by the probe. This modification may also, in some instances, include adjusting the output of a cooking element of the microwave oven, which may in turn increase or decrease the amount the heat inside of the microwave oven. For example, this modification may include reducing the output of the cooking element in order to prevent the food item from exceeding a desired preset temperature. In other instances, this modification may include adjusting a preset cooking time based on the signal received from the probe regarding the one or more environmental conditions. For example, where the probe measures a temperature that is below a predetermined threshold, the cooking time may be extended by predetermined length of time (for example thirty seconds, one minute, five minutes, etc.).

In block 870, the controller may, optionally, display the one or more measured environmental conditions for a user. In some instances, this display may be in the form of a digital number, text, or other read out on an LCD/LED screen; however, this is not intended to be limiting. In other embodiments the display may be in the form of one or more indicator lights, etc.

In some instances the microwave oven 10 with a probe 36 for measuring one or more environmental conditions, such as illustrated in FIGS. 1 and 2 and described herein may be utilized for sous vide cooking within the microwave. Sous vide cooking is a method of cooking where food is placed in a container (e.g. a plastic pouch, silicone pouch, glass jar, or the like). This container is then placed into a water bath, such as illustrated in FIG. 1, and allowed to cook for extended periods for time (e.g. 1 to 7 or more hours) at a regulated temperature. The goal of sous vide cooking is to evenly cook the food item(s), retaining moisture without overcooking.

Figure 9:
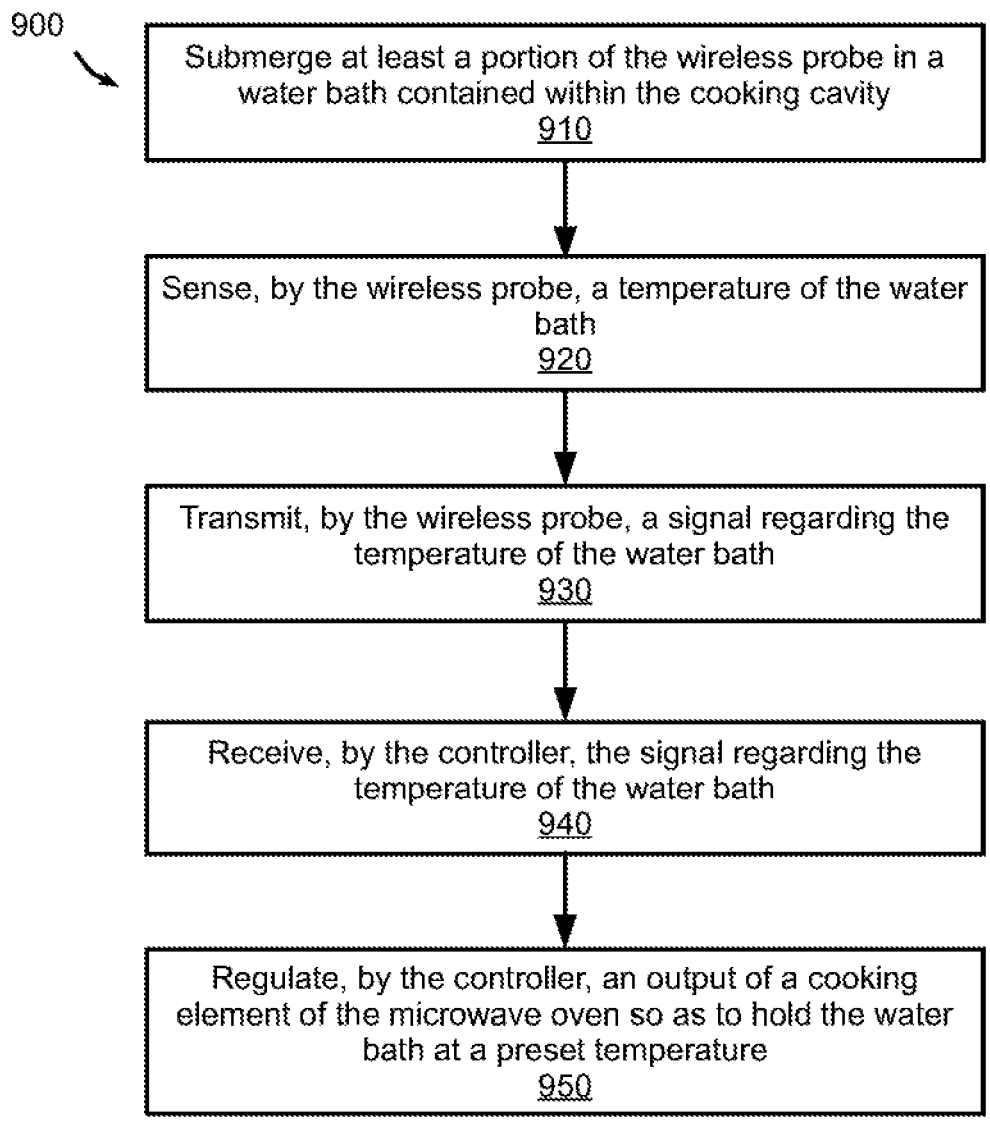
FIG. 9 is an operational flow for sous vide cooking in a microwave oven consistent with some embodiments of the invention.

An example embodiment of an operational flow of sous vide cooking 900 in a microwave oven is illustrated in FIG. 9. In block 910, at least a portion of the probe is submerged in a water bath positioned within the cooking cavity. In some embodiments, the probe further includes a clip, or other attachment, mechanism to facilitate submerging the probe into the water bath. In some embodiments, this probe may be any of the probes described herein, including both wired or wireless embodiments. In other embodiments, the probe may be any other type of probe (wired or wireless) known in the art. In some instances, the probe may also further include a water circulator on at least the portion of the probe submerged into the water bath. Where present, this water circulator may circulate the water in the water bath and facilitate maintaining an even water temperature throughout the entirety of the water bath.

In block 920, the probe senses a temperature of the water bath. In some embodiments, the probe may measure the temperature of the water bath at one or more predetermined time intervals; in other embodiments, the probe may be constantly measuring the temperature of the water bath. In still other embodiments, the probe may only measure the temperature of the water bath when signaled by user input via one or more user activated controls.

In block 930, the probe may transmit a signal regarding the temperature of the water bath. In some instances, the probe may further include an antenna to facilitate wireless transmission of data. In block 940, the controller may receive the transmission of the signal from the probe. In block 950, the controller regulates the output of a cooking element of the microwave oven in order to maintain the water bath at a preset temperature. In some embodiments, the preset temperature may be a temperature range, for example between about 63 degrees Celsius and 74 degrees Celsius. In other embodiments, the preset temperature may be a narrow temperature range, for example between about 64 and about 66 degrees Celsius. It still other embodiments, the preset temperature may be a precise temperature measurement, for example about 63 degrees Celsius.

It will be appreciated that various additional modifications may be made to the embodiments discussed herein, and that a number of the concepts disclosed herein may be used in combination with one another or may be used separately. Other modifications will be apparent to those of ordinary skill in the art having the benefit of the instant disclosure. Therefore, the invention lies in the claims hereinafter appended.

What is claimed is:

1. A microwave oven, comprising:
   a housing;
   a rotating turntable assembly disposed in a cooking cavity of the housing;
   a probe powered by the turntable assembly,
      wherein the probe is configured to measure an environmental condition during a cooking cycle, wherein the environmental condition is a temperature or a moisture level,
      wherein the probe is configured to transmit a signal regarding the environmental condition; and
   a controller disposed in the housing and configured to:
      receive the signal regarding the environmental condition from the probe.

2. The microwave oven of claim 1, wherein the turntable assembly includes a generator that is powered by rotation of the turntable assembly.

3. The microwave oven of claim 2, wherein the generator further includes a wheel that contacts a surface in the cooking cavity and that drives the generator as the rotating turntable rotates.

4. The microwave oven of claim 1, wherein the turntable assembly includes an axle that powers the probe.

5. The microwave oven of claim 4, wherein the axle includes first and second electrical contacts that communicate an electrical power signal to the probe.

6. The microwave oven of claim 1, further comprising a wireless transmitter in communication with the probe and an antenna coupled to the wireless transmitter to transmit the signal regarding the environmental condition to the controller, and wherein the controller is coupled to a wireless receiver configured to receive the signal regarding the environmental condition from the wireless transmitter.

7. The microwave oven of claim 1, wherein the environmental condition is a temperature.

8. The microwave oven of claim 7, wherein the probe is insertable into a food item and the temperature measured is an internal temperature.

9. The microwave oven of claim 7, wherein the controller is further configured to display the temperature measured by the probe.

10. The microwave oven of claim 1, wherein the probe is configured to rotate with a rotatable portion of the turntable assembly.

11. The microwave oven of claim 1, wherein the environmental condition is a moisture level.

12. The microwave oven of claim 1, wherein the controller is further configured to modify one or more microwave oven settings in response to the signal regarding the environmental condition.

13. A method of operating a microwave oven including a housing, a rotating turntable assembly disposed in a cooking cavity, a probe, and a controller, the method comprising:
   rotating the rotating turntable assembly;
   powering the probe with the rotating turntable assembly during rotation of the rotating turntable assembly;
   sensing, by the probe, an environmental condition, wherein the environmental condition is a temperature or a moisture level;
   transmitting, by the probe, a signal regarding the sensed environmental condition; and
   receiving, by the controller, the signal regarding the environmental condition.

14. The method of claim 13 further including modifying, by the controller, one or more microwave oven settings in response to the environmental condition sensed.

15. The method of claim 13, wherein the environmental condition is a temperature and the method further comprises displaying the temperature sensed by the probe.

16. The method of claim 13, wherein the modifying one or more microwave oven settings includes adjusting an output of a cooking element of the microwave oven.

17. The method of claim 13, wherein the modifying one or more microwave oven settings includes adjusting a preset cooking time.

18. The method of claim 13, wherein powering the probe with the rotating turntable assembly includes powering a generator by the rotating the turntable assembly.

19. The method of claim 13, wherein powering the probe with the rotating turntable assembly includes powering the probe from an axle of the rotating turntable assembly.

20. The method of claim 13, wherein the probe is wireless and transmitting the signal regarding the environmental condition further includes transmitting the signal with a wireless transmitter and antenna.

21. The method of claim 13, wherein the environmental condition is a moisture level.

22. A method of operating a microwave oven for sous vide cooking, the microwave oven including a housing, a cooking cavity disposed within the housing, a rotating turntable assembly disposed in the cooking cavity, a probe, and a controller, the method comprising:
   submerging at least a portion of the probe in a water bath contained within the cooking cavity;
   rotating the rotating turntable assembly;
   powering the probe with the rotating turntable assembly during rotation of the rotating turntable assembly;
   sensing, by the probe, a temperature of the water bath;
   transmitting, by the probe, a signal regarding the temperature of the water bath;
   receiving, by the controller, the signal regarding the temperature of the water bath; and
   regulating, by the controller, an output of a cooking element of the microwave oven so as to hold the water bath at a preset temperature.

* * * * *